March 25, 1952     C. KELLER     2,590,545
PLANT FOR THE PRODUCTION OF COMPRESSED AIR
Original Filed Aug. 8, 1945     2 SHEETS—SHEET 1

Inventor
Curt Keller

Patented Mar. 25, 1952

2,590,545

UNITED STATES PATENT OFFICE 2,590,545

PLANT FOR THE PRODUCTION OF COMPRESSED AIR

Curt Keller, Kusnacht, Switzerland, assignor to Aktiengesellschaft Fuer Technische Studien, Zurich, Switzerland, a corporation of Switzerland Original application August 8, 1945, Serial No. 609,679. Divided and this application November 22, 1949, Serial No. 128,738. In Switzerland August 12, 1944

3 Claims. (Cl. 263—19)

This invention relates to a plant for the production of compressed air, for example blast furnace air, in which air is brought in at least one compressor to a higher pressure than that corresponding to the pressure at which it is to be used, then heated in a heater by an indirect supply of heat derived from an external source and hereupon expanded whilst giving up energy in at least one turbine which drives the compressor. The object of the invention is to provide a plant of this kind in which the consumption of energy and of heat per normal cubic metre of compressed air is small and which realizes by simple combustional means an economical improvement in comparison with hitherto existing plants.

The invention bases on the fact that a comparatively large amount of heat is still contained in the exhaust air of the turbine. Now, the efficiency of plants of the type in question is higher, the higher the degree to which it is possible to utilize the heat content of the exhaust air of the plant without it being necessary to provide, for example, heat exchangers of large dimensions.

The present application is a division of my copending application Ser. No. 609,679, filed August 8, 1945, now Patent No. 2,539,744, issued January 30, 1951.

In the embodiments of the concept presented in this divisional application, a portion of the air is branched off the compressor at a point or points in advance of the last stage and is delivered to the consumer of compressed air preferably after passage through a heater. The remainder of the air passes through the higher stages of the compressor, then passes through a heater, and then is expanded through a turbine which drives the compressor and may also drive other energy consuming devices. At least a part of the exhaust from the turbine is fed to one or both of the heaters above-mentioned, as air for combustion purposes.

Figure 1:
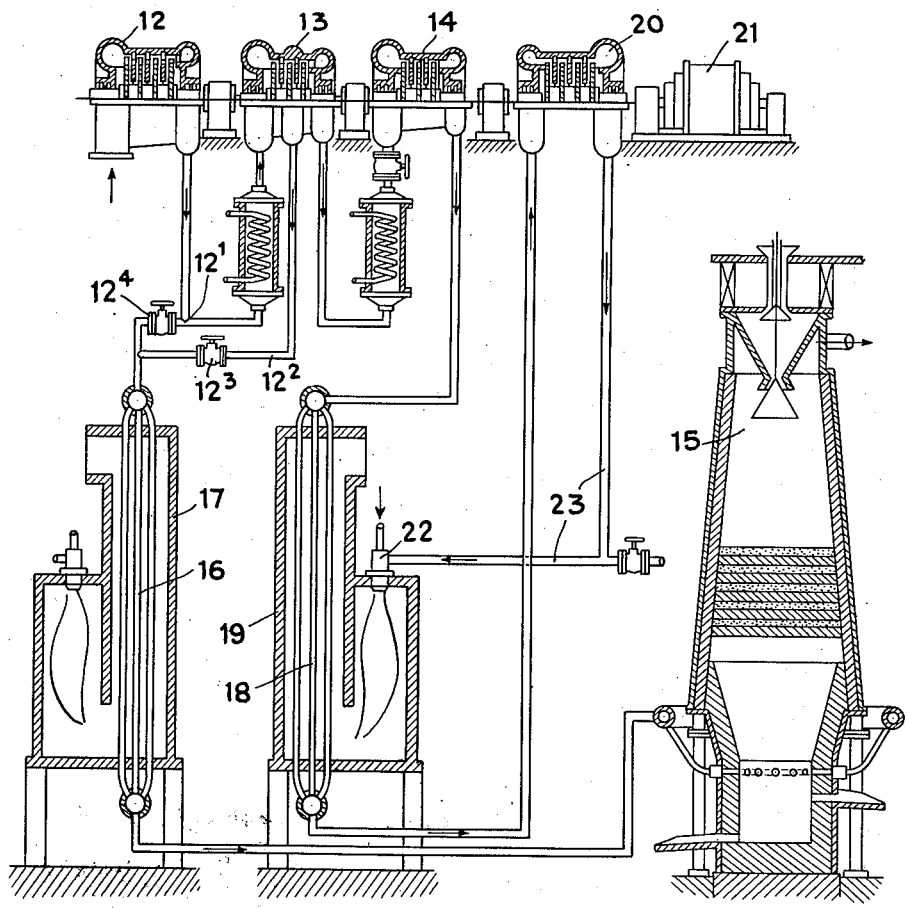
Figure 2:
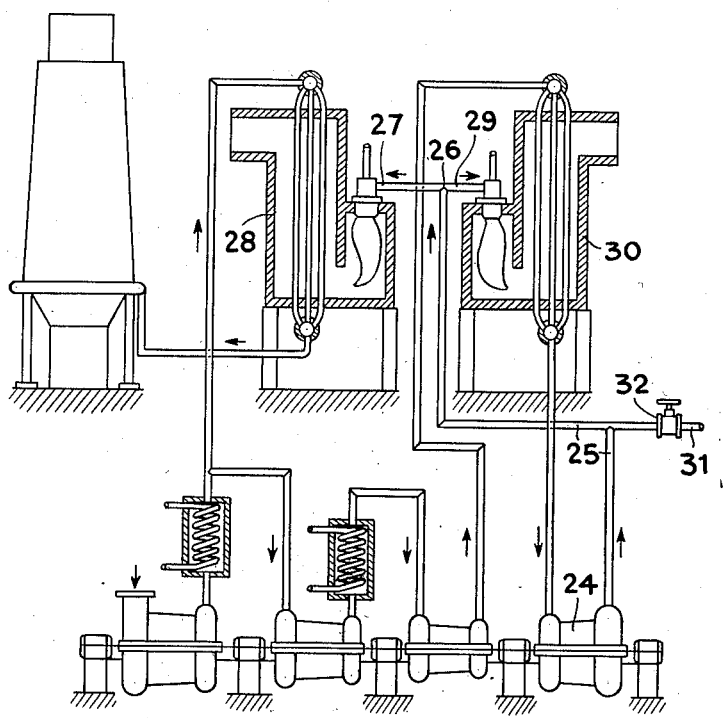

Two such arrangements are illustrated by way of example and in simplified form on the accompanying drawings in which:

Fig. 1 shows a plant in which the compressed air required in a blast furnace is branched off beyond the last stage of the first casing of a three-casing multistage rotary compressor, and is heated in a heater separate from that which heats the air required for producing energy, and Fig. 2 shows a plant in which the supply of heat to the compressed air to be consumed and to the air required for producing energy takes place in two separate tubular heaters, in each of which exhaust air from the turbine is used as combustion air.

In Fig. 1 the reference numerals 12, 13 and 14 denote three casings of a compressor with three casings, which draws in air from the atmosphere and compresses it with intermediate cooling to a pressure beyond that which is required in the consumer of compressed air, the latter being shown, as it is in the parent application, as a blast furnace 15. The air to be supplied to the blast furnace 15 is branched off from the quantity of air drawn in by the compressor 12, 13, 14 beyond the first casing of the compressor 12 at the point $12^1$ and passes by way of an open valve $12^4$ and a heating system 16, which is arranged in a heater 17, into the blast furnace 15. The remaining portion of the air drawn in by the compressor 12, 13, 14 is delivered to a heating system 18, which is arranged in a heater 19. In the heating system 18 indirect external heat is supplied to the portion of the air passing through it, after which this portion flows into a turbine 20 in which it expands while giving up energy, such energy serving to drive the compressor 12, 13, 14 and a machine 21. The latter may be a motor-generator which can supply any supplementary energy which may possibly be required to drive the compressor 12, 13, 14, and if need be, may serve as a booster for the machine group 12, 13, 14, 20, when starting up. The machine 21 thus corresponds to the machine $9^7$ shown in the parent application. The quantity of expanded air emerging from the turbine 20 flows through a pipe 23 to the burner 22 of the heater 19 for the support of combustion. In this embodiment the air required in the blast furnace 15 is branched off at a point in advance of the last stage of the compressor 12, 13, 14. A further pipe $12^2$ with an inserted adjustable valve $12^3$ is branched off from a stage of the compressor section 13 so that the air required in the blast furnace 15 can also be tapped at this point instead of at the point $12^1$. In this embodiment in which the consumption air is heated in the heater 17 prior to its passage into the blast furnace 15, the point at which the air for consumption is branched off is a movable one.

If required the quantity of air compressed in the compressor 12, 13, 14 to the final pressure can be varied by means of the valves $12^3$ and $12^4$.

The embodiment of the invention illustrated in Fig. 2 differs from that shown in Fig. 1 in that the exhaust air of the turbine 24 separates into two portions at the point 26 of the exhaust pipe 25, one of these portions passing into a pipe 27 connected to the heater 28 for the air to be consumed, whilst the second portion passes, at least in part, through a pipe 29 into the heater 30 for the air required for driving the plant. The numeral 31 designates a pipe provided with a valve 32 and connected either to a consumer of hot air, not shown, or to the atmosphere. In this plant the turbine 24 produces not only the energy required for the compression of the air for consumption and of the air driving the plant, but supplies also the combustion air required in the heater 28 for heating the air for consumption and in the heater 30 for heating the air driving the plant.

In the case of the embodiment shown in Fig. 2 the quantity of combustion air, namely the volume of expanded air, which passes into the heater 30 for heating the driving air, can be twice as large as the quantity of air that is required for complete combustion in this heater. The volume of expanded air flowing for combustion purposes to the burners of the heater 28 (Fig. 2) for the air to be consumed can also conveniently be twice as large as the volume of air that is required in said heater 28 for effecting complete combustion. The use of such a large volume of surplus air for heating the air to be expanded in the turbine 24 involves a corresponding increase in the quantity of air flowing through this turbine. In this way it is possible, as is already known, to produce in the turbine the necessary power for driving the compressor even when lower inlet temperatures and pressures are adopted, so that both the compressor and turbine can be constructed with fewer stages and reduced wall thicknesses. Furthermore, the tubes of the heater, if the latter is of the tubular type, and also the turbine parts can be subjected to higher temperatures, since the pressure stresses originating from the working medium becomes correspondingly smaller. An operation with high turbine inlet temperatures has a favourable effect on the overall efficiency of the plant. This favourable effect is further increased by the fact that in spite of operation with high temperatures of the working medium, no appreciable amount of the heat in the expanded air issuing from the turbine need be lost since the temperature of this exhausted air is further utilized in the heater. The temperatures of the gases issuing from this heater are, however, considerably lower than the temperature of the air issuing from the turbine.

As a consequence of the large volume of driving air that is available in the turbine the power required for driving the compressor can even be produced without it being necessary to equip the compressor with intermediate coolers, which are usually provided in order to enable the turbine to drive the compressor under all load conditions. Such an arrangement of the compressor without intermediate cooling involves a considerable saving in the initial cost, weight and space requirements of the plant.

Although it may at first sight appear inappropriate to use the large air surplus above referred to for heating the air driving the turbine, since the volume of waste gas issuing from the heater and the volume of heat eliminated by same are then correspondingly greater, the supply of a large air surplus nevertheless allows of such technical advantages being attained that the latter more than compensate said drawbacks.

By introducing into the heaters a volume of expanded air issuing from the turbine for combustion purposes, which is at least twice as large as the quantity of air required in these heaters for complete combustion, it is further possible with the aid of the large air surplus to reduce the temperature of the combustion chamber to such an extent—whereby this temperature is, of course, still sufficient for heating the air to the required temperature—that the slag particles contained in the combustion gases solidify before they can impinge on the tubes, thus leading to the formation of granulated slag. In this way the formation of incrustations which endanger the reliability in operation and reduce the efficiency is prevented.

For putting the invention into practice it is immaterial how the compressors, the heaters for the consumption air and the driving air and the air consumer itself are designed. For example, the air consumer may also be a compressed air plant in which case only the driving air of the installation has to receive heat from an external source, but not the consumption air.

In this connection the expression "combustion air" implies both, air used as so-called primary air during the combustion as also air which during heating of the driving air is supplied to any part of the heater in the form of secondary air.

The back-pressure of the turbine wherein the heated air expands whilst giving up energy can be as large as desired. If combustion in the heaters takes place under pressure the back-pressure can be suited, for example, to the corresponding combustion chamber pressure so that the necessity of providing a compressor for bringing the required combustion air to the necessary pressure is eliminated.

What is claimed is:

1. In a plant for producing wind for metallurgical furnaces or similar consumers, the combination of a stage turbine having an inlet and exhaust; a multi-stage rotary compressor connected to be driven by said turbine and having an air intake and a discharge for compressed air; and air tap leading from said compressor at a point in advance of at least its last stage; a first connection for conducting air from said tap to a consumer external to the plant; a second connection leading from the compressor discharge to the turbine inlet; surface heat exchangers, one interposed in each of said first and second connections; combustion heating means arranged to deliver heat to said exchangers and discharger combustion products to atmosphere; and a third connection leading from the turbine exhaust and serving to supply combustion air to said heating means.

2. The combination defined in claim 1 in which there are a plurality of taps each leading from the compressor at a different point each in advance of the last stage thereof, and each connected through a valve with said first connection.

3. The combination defined in claim 1 in which the combustion heating means, the stage turbine and the stage compressor are so proportioned, that the air exhausted by the turbine is approximately twice the quantity required for complete combustion in said heating means.

CURT KELLER.

REFERENCES CITED

The following references are of record in the file of this patent:

UNITED STATES PATENTS

| Number | Name | Date |
|---|---|---|
| 2,253,809 | Pfenninger | Aug. 26, 1941 |
| 2,303,381 | New | Dec. 1, 1942 |
| 2,394,253 | Nettel et al. | Feb. 5, 1946 |
| 2,457,594 | Nettel et al. | Dec. 28, 1948 |